Dec. 6, 1932.  F. H. OWENS  1,889,840
COMBINED MOTION PICTURE AND SOUND CAMERA
Filed July 13, 1927   2 Sheets-Sheet 1

INVENTOR.
FREEMAN H. OWENS.
BY John O. Brady
ATTORNEY

Dec. 6, 1932.    F. H. OWENS    1,889,840
COMBINED MOTION PICTURE AND SOUND CAMERA
Filed July 13, 1927    2 Sheets-Sheet 2
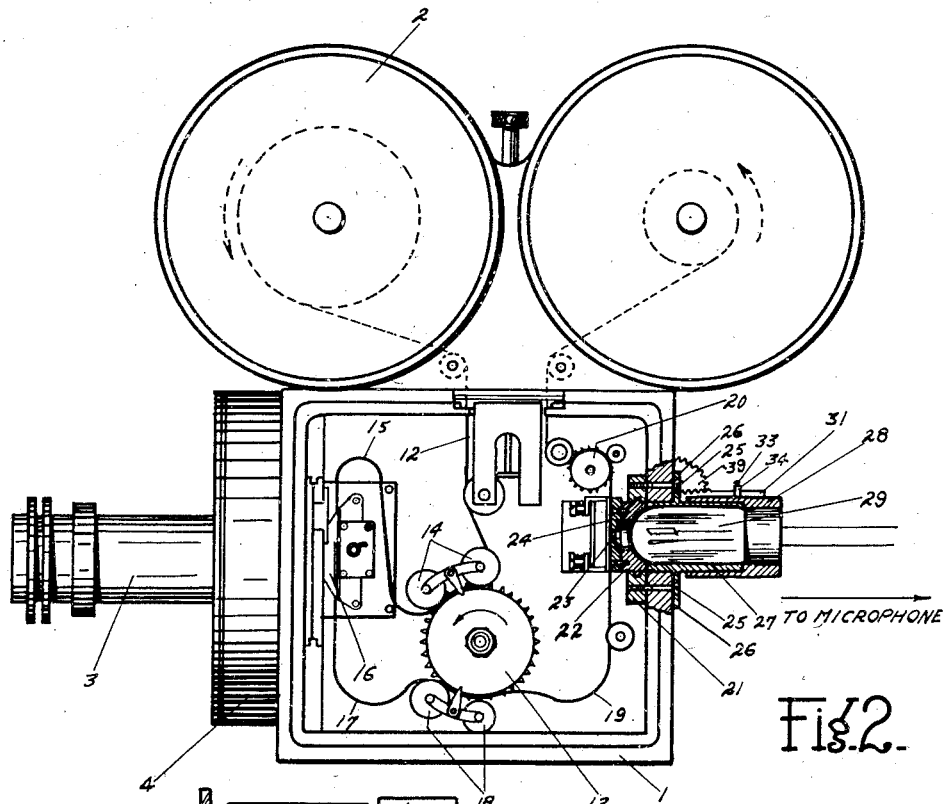
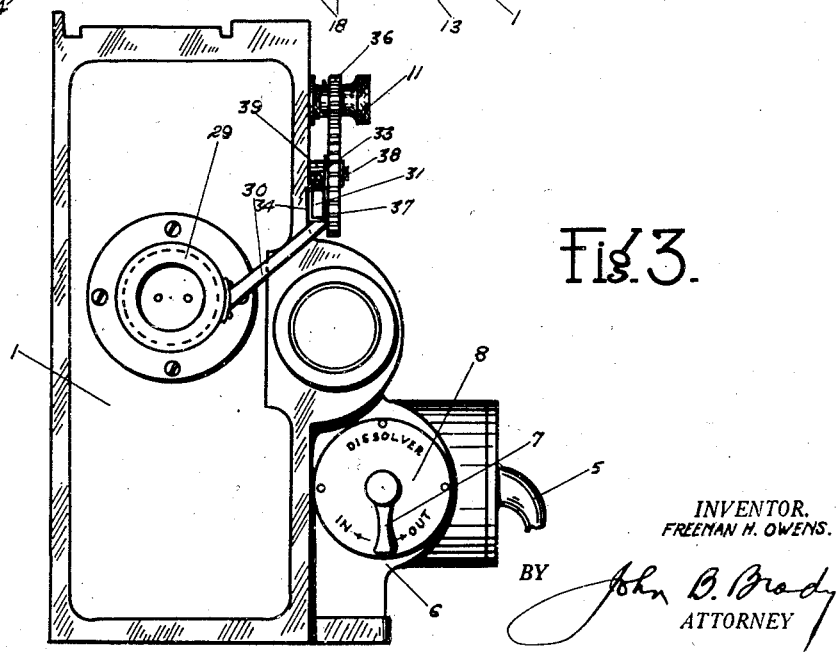
INVENTOR.
FREEMAN H. OWENS.
BY John B. Brady
ATTORNEY Patented Dec. 6, 1932

1,889,840

UNITED STATES PATENT OFFICE

FREEMAN H. OWENS, OF NEW YORK, N. Y.

COMBINED MOTION PICTURE AND SOUND CAMERA

Application filed July 13, 1927. Serial No. 205,444.

In the making of motion pictures, it is common practice to fade one scene into another or dissolve out one scene and dissolve in the next. As is well known for dissolving out a picture, the picture film gets darker and darker until it is black and for dissolving in a scene, the film starts at black and gets lighter gradually until the scene is fully exposed. This is accomplished in the taking of motion pictures by controlling the shutter through which the exposure is made by a mechanism which gradually cuts off or increases the exposure as desired.

Since the development of the recording of sound on film and particularly in connection with motion pictures, generally known as "talking pictures", cameras have been provided wherein the pictures may be photographed and the sound recorded on the same film simultaneously with the taking of the pictures. On such a combined picture and sound film, it is advisable that where there appears a dissolve or fade in the picture, the volume of sound should be proportional therewith. In other words, if a scene is dissolved in or out, the sound should likewise become louder and louder as the picture gets brighter and gradually fade out if the picture dissolves out.

The primary object of my invention is to provide a simple mechanical means for accomplishing this dissolving of the sound in connection with the picture dissolve.

Another object is to provide a sound dissolving mechanism which operates in conjunction with the picture or shutter dissolving mechanism, whereby when a picture dissolve is made, the sound will likewise dissolve.

Still another object is to provide such a dissolving mechanism which includes a slidable support for the sound recording lamp whereby to move the same toward or away from the slit member through which the sound record is exposed.

Hereafter in the specification and claims wherever the term "dissolve" or "dissolving" is used, it is to be understood that such term refers to the fading in or out of the picture scenes or sound as above described.

Referring now to the figures of the drawings wherein like reference numerals indicate like parts.

Figure 2 is a side view taken from the opposite side of that shown in Figure 1 and with the cover plate of the camera removed and certain parts in section for clearness.

Figure 3 is a rear end view of the camera.

Figure 1:
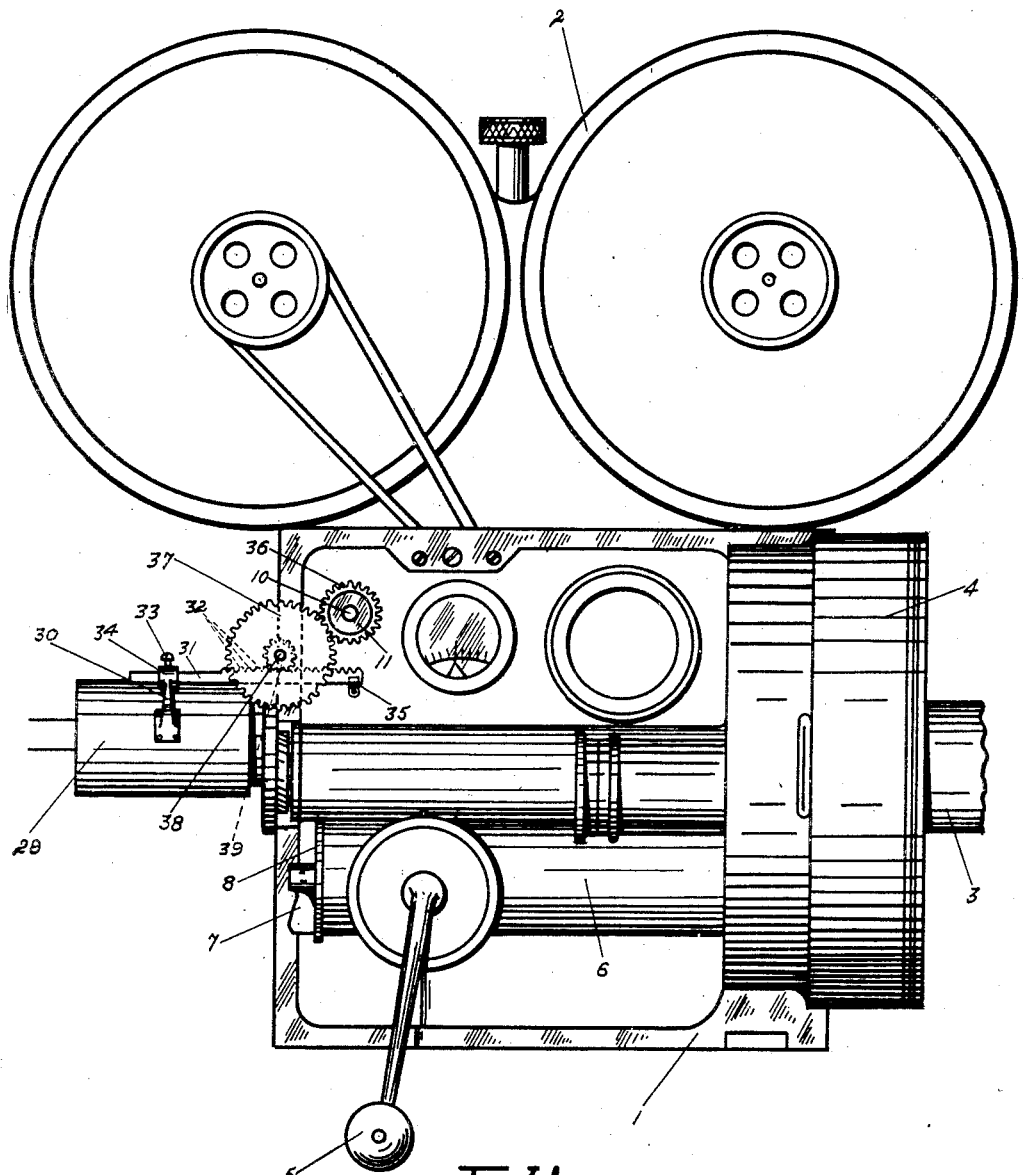
Figure 1 is a side view of my improved combined motion picture and sound camera illustrating the sound dissolving mechanism.

Reference numeral 1 refers to a camera casing upon which is mounted the film magazine 2, lens mount 3, shutter housing 4, and crank 5 for operating the shutter and driving the film through the camera.

This camera may be of the conventional type for taking moving pictures and is provided with any preferred form of shutter dissolving mechanism, that is, the mechanism for controlling the shutter to dissolve a scene in or out. This shutter dissolving mechanism has not been shown in detail as the details thereof form no part of this invention and any preferred form well known in the art may be used. Suffice it to say by way of explanation, that the camera is provided with a housing 6 in which such shutter dissolving mechanism is mounted, the controlling finger piece 7 of which extends through the housing 6 and operates over a dial 8 whereby the dissolving mechanism is under the instant control of the operator.

As is well known in the art, this dissolving mechanism is suitably connected to the winding mechanism of the camera, operated by the crank 5, in such manner that the setting of the operating member 7 to "in" or "out" position and subsequent operation of the winding mechanism results in the actuation of the shutter dissolving mechanism.

There is likewise provided on the camera another conventional control means for the shutter dissolving mechanism which includes the shaft 10 on the outer end of which is mounted the finger piece 11. This form of control is likewise well known in the art and need not be described in detail except to say that upon turning the shaft 10 in one direction or the other, the shutter dissolving mechanism can be operated by hand and at the speed and in the discretion of the operator. Suitable mechanism is provided (not shown) for connecting the automatic dissolving mechanism, operated by the control member 7, and the hand operated dissolving mechanism just referred to whereby the operation of the automatic control also operates the hand control. This mechanism is so arranged, however, that the hand control mechanism may be operated independently, if desired. Such arrangement is common practice.

This brief reference to the picture or shutter dissolving mechanism of the camera is made solely for the purpose of showing an operative relation between such mechanism and the sound dissolving mechanism to be described. No claim is made to novelty in the picture or shutter dissolving mechanism, per se.

One side of the camera 1 is provided with a sound recording means preferably located at a point directly opposite the picture taking station. With reference to the Figure 2, it will be noted that the film 12 is drawn downwardly from the film magazine 2 by means of a sprocket 13 around a portion of the periphery of which said film 12 is engaged and held in such engagement by the rollers 14. The film 12 is then looped as at 15 and passes through the film gate 16 at which point the images or scenes are photographed thereon.

After leaving the gate 16, the film is again looped as at 17 and again engages a portion of the periphery of the sprocket 13, being held in engagement therewith by the rollers 18, from whence it passes into a third loop 19 and then upwardly past the sound recording means.

The picture taking mechanism, not shown in detail, is preferably of the ordinary intermittent type and after the film leaves the sprocket 13, it is moved upwardly past the sound recording station in a continuous movement by means of the sprocket 20 suitably driven from the film winding mechanism and synchronously therewith. From this point, the film 12 is passed upwardly and wound upon the take up reel in the film magazine.

The sound recording mechanism comprises a support 21 carrying a laterally adjustable slit holder 22 in which is mounted a slit member 23 past which and in engagement with which the film 12 travels. The film is held in engagement with the slit member 23 by means of a presser pad or gate 24. Secured to the outer surface of the camera wall at this point, as by the screws 25 passing through the flanges 26 is a fixed tube 27 projecting through the wall of the camera and into engagement with the slit holder 22. Slidably mounted over the tube 27 is a sleeve 28 within which is carried a recording lamp 29 of any suitable character adapted for recording sound photographically.

From the foregoing, it will be observed that simultaneous with the taking of the pictures at the picture taking station 16, there will also be recorded the sound on the same film as photographed by the varying intensity of the recording lamp 29, which intensity is modulated by the sound currents passing through said lamp from the microphone. The fact that the picture taking station and the sound recording station are spaced apart and act upon the film at different points, is an advantage in view of the fact that on the projection apparatus (not shown) in which the "talking film" is projected and the sound reproduced, the projecting and reproducing stations are spaced apart. Therefore, the length of the film between the picture taking station and the sound recording station in this camera is regulated to exactly the distance between the projecting station and the sound reproducing station in the projector.

It will be understood that if the lamp 29 is moved toward or away from the slit member 23, such movement will govern the photographic record of the sound represented by the varying light intensities passing through the slit member to the film and thus produce a fade or dissolve in the sound record. For instance, if the lamp 29 is moved away from the slit member, the recorded sound record on the film will fade out or dissolve out in intensity and volume. Likewise, if the slidable lamp is moved toward and into close proximity with the slit member, the volume and intensity of the light from the lamp 29 will produce a fade in or dissolve in on the sound record.

Means are, therefore, provided for causing such movement of the lamp 29 and for causing such movement synchronously with the operation of the picture or shutter dissolving mechanism. To this end, the slidable sleeve 28 is provided with an arm 30 secured at one end to the sleeve and at its opposite end to a rack 31 having teeth 32 cut in the upper side thereof. This rack 31 is adjustably secured to the arm 30 by means of a set screw 33 which locks said rack rigidly in a bearing 34. One end of this rack is guided and supported by a bracket 35.

I mount on the shaft 10 of the hand dissolving mechanism for the shutter dissolve, a gear 36 which meshes with a relatively large gear 37 mounted on a stub shaft 38 which also carries a pinion 39 meshing with the teeth 32 of the rack 31. It will be understood, therefore, that upon rotation of the shaft 10 to operate the shutter dissolving mechanism, whether such rotation results from the manual operation of the finger piece 11 or automatically through the means of the automatic shutter dissolving mechanism controlled by the operating member 7, the rack 31 will be moved longitudinally, this resulting in a sliding movement of the sleeve 28 and consequently the lamp 29 toward or away from the slit member 23. Therefore, simultaneously with the operation of the shutter or picture driving mechanism of the camera, there will always be operated this sound dissolving mechanism by the sliding movement of the lamp 29.

Of course, many changes may be made by way of detail in construction and operation without departing from the spirit and scope of my invention. I do not limit myself, therefore, to the exact details and combinations herein shown and described other than by the appended claims.

I claim:—

1. In combination with a motion picture camera provided with shutter "dissolving" means, a film movable through said camera for receiving picture images, means on said camera for recording sound on said film, and means on said camera for "dissolving" the sound being recorded on said film, said shutter "dissolving" means and sound "dissolving" means being operatively connected whereby both the picture images and sound record are "dissolved" simultaneously.

2. In combination with a motion picture camera provided with shutter "dissolving" means, a film movable through said camera for receiving picture images, means on said camera for recording sound on said film comprising a slit member past which said film moves and a movable recording lamp adjacent said slit member, and means for moving said lamp toward and from said slit member whereby the recorded sound is "dissolved" said last mentioned means and said shutter "dissolving" means being operatively connected.

3. In combination with a motion picture camera provided with shutter "dissolving" means, a film movable through said camera for receiving picture images, means on said camera for recording sound on said film comprising a slit member past which said film moves and a movable recording lamp adjacent said slit member, and means for moving aid lamp toward and from said slit member whereby the recorded sound is "dissolved", said moving means having operative connection with said shutter "dissolving" means whereby both the picture images and sound record are "dissolved" simultaneously.

4. In combination with a motion picture camera provided with shutter "dissolving" means, a film movable through said camera for receiving picture images, means on said camera for recording sound on said film comprising a slit member past which said film moves, a slidable tube adjacent said slit member carrying a recording lamp, and means connected with said shutter "dissolving" means and operated thereby for sliding said tube and said lamp toward and away from said slit member whereby both the picture images and sound record are "dissolved" simultaneously.

5. In combination with a motion picture camera provided with shutter "dissolving" means, a film movable through said camera for receiving images at one point, said shutter "dissolving" means adapted to "dissolve" said images at such point, means on said camera for recording sound on said film at a point spaced from said image receiving point, means on said camera for "dissolving" the sound at the point of recording, and means for operating said sound "dissolving" means and said shutter "dissolving" means simultaneously.

6. In combination with a motion picture camera provided with shutter "dissolving" means, a film movable through said camera for receiving images at one point, said shutter "dissolving" means adapted to dissolve said images at such point, means on said camera for recording sound on said film at a point spaced from said image receiving point, said means comprising a recording lamp slidable toward and away from said film, means in operative connection with said lamp for sliding the same, said means being connected to said shutter "dissolving" means to operate simultaneously therewith.

7. In combination with a motion picture camera provided with a shutter "dissolving" means including a shaft, and a gear thereon, a film movable through said camera for receiving images at one point, said shutter "dissolving" means adapted to "dissolve" images at such point, sound recording means on said camera at a point spaced from said image receiving point and including a slit member past which said film moves, and a slidable tube carrying a recording lamp movable toward and away from said slit member whereby said recorded sound may be "dissolved", a toothed rack slidable adjacent said tube, gear connections between said first named gear and said rack, whereby operation of said shutter "dissolving" means operates said rack, and means on said rack for sliding said tube.

8. In combination with devices for synchronously recording sound and action on photographic film, the action portion of the devices having means for photographically fading in and out the recorded action, of means controlled by the action fading in and out means for photographically fading in and out the sound record simultaneously with the fading in and out of the action record.

9. In combination with devices for recording sound and action on photographic film, the action portion of the devices having means for fading the recorded action, of means cooperating with the action fading means for fading the sound record simultaneously with the fading of the action record.

10. The combination with means for recording sound and scene, of means for fading the scene record, and means cooperating with said first-mentioned means for simultaneously fading the sound record.

11. In combination with devices for recording in timed relation sound and action on photographic film, the sound portion of the devices comprising a light source and a light slit, and the action portion of the devices having means for photographically fading in and fading out the recorded action, of means cooperating with the action fading in and out means for photographically fading in and out the sound record simultaneously with the fading in and out of the action record, said sound fading means including means for moving said light source to and from said light slit.

12. Motion picture film apparatus arranged to fade motion picture action in and out as the film is advanced, sound film apparatus arranged to fade sound in and out, and means controlled by the operation of the picture film apparatus during the fading in and out of the action arranged to effect fading in and out of the sound by the sound film apparatus simultaneously with the fading in and out of the action by the picture film apparatus.

13. A motion picture film apparatus having shutter dissolving mechanism in combination with sound film apparatus having means for dissolving sound effects in and out, and unitary control means for simultaneously actuating the shutter dissolving mechanism and the dissolving means for said sound effects.

14. A motion picture and sound film apparatus according to claim 13 in which the means for dissolving sound in and out comprises means for varying the average intensity of light exposure to the film of said sound film apparatus.

FREEMAN H. OWENS.